US008867742B2

(12) United States Patent
Hirota

(10) Patent No.: US 8,867,742 B2
(45) Date of Patent: Oct. 21, 2014

(54) OPTICAL TRANSMISSION DEVICE AND RECEPTION DEVICE FOR YUEN ENCRYPTION, OPTICAL TRANSMISSION METHOD AND RECEPTION METHOD FOR YUEN ENCRYPTION, AND ENCRYPTED COMMUNICATION SYSTEM

(75) Inventor: Osamu Hirota, Yokohama (JP)

(73) Assignee: Tamagawa K-12 & University, Machida-shi (JP)

( * ) Notice: Subject to any disclaimer, the term of this patent is extended or adjusted under 35 U.S.C. 154(b) by 123 days.

(21) Appl. No.: 13/582,581

(22) PCT Filed: Mar. 2, 2011

(86) PCT No.: PCT/JP2011/054688
§ 371 (c)(1),
(2), (4) Date: Sep. 4, 2012

(87) PCT Pub. No.: WO2012/046463
PCT Pub. Date: Apr. 12, 2012

(65) Prior Publication Data
US 2012/0328100 A1 Dec. 27, 2012

(30) Foreign Application Priority Data
Oct. 8, 2010 (JP) ................................ 2010-228259

(51) Int. Cl.
*H04K 1/00* (2006.01)
*H04L 9/08* (2006.01)
*H04L 9/06* (2006.01)
*H04L 9/00* (2006.01)

(52) U.S. Cl.
CPC ............ *H04L 9/0852* (2013.01); *H04L 9/0662* (2013.01); *H04L 9/002* (2013.01)
USPC ............ 380/256; 380/255; 380/268; 380/278

(58) Field of Classification Search
CPC .. H04L 9/0852; H04L 9/0858; H04L 2209/08
USPC .................... 380/268, 255–256, 278
See application file for complete search history.

(56) References Cited

U.S. PATENT DOCUMENTS 8,175,273 B2 * 5/2012 Kawamoto et al. ............ 380/263
2002/0048370 A1 * 4/2002 Hirota et al. .................. 380/278
(Continued)

FOREIGN PATENT DOCUMENTS

JP 09-018473 A 1/1997
JP 2002-040939 A 2/2002
(Continued)

OTHER PUBLICATIONS

Kenichi Ohhata, Osamu Hirota, Makoto Honda, Shigeto Akutsu, Yoshifumi Doi, Katsuyoshi Harasawa, and Kiichi Yamashita, 10-Gb/s Optical Transceiver Using the Yuen 2000 Encryption Protocol, Sep. 15, 2010, IEEE, vol. 28, pp. 1-10.*
(Continued)

*Primary Examiner* — Luu Pham
*Assistant Examiner* — Fahimeh Mohammadi
(74) *Attorney, Agent, or Firm* — Westerman, Hattori, Daniels & Adrian, LLP

(57) ABSTRACT

A configuration method of an optical signal, an encryption device, and an encryption system makes it possible for a legitimate communicating party to ensure information-theoretic security against a known plain text attack and to communicate long-distance. By adding a transmission information data sequence randomization device to the Yuen encrypted communications device according to the present information, which divides transmission information data into blocks, appends sequence numbers thereto, randomly switches the sequence of the blocks with a digitized signal of output of an electrical noise generator, and inputs same into a transmission data generator of a conventional Yuen encrypted optical transmitter, the relation between a known transmission information data sequence (plain text) and an optical signal which is outputted from the transmitter is randomized, allowing forcibly making even a circumstance wherein a known-plain text attack would be possible into a cipher-text-only attack, realizing information-theoretic security against a known-plain text attack.

5 Claims, 5 Drawing Sheets

(56) References Cited

U.S. PATENT DOCUMENTS

| | | | | |
|---|---|---|---|---|
| 2007/0212063 A1* | 9/2007 | Meli et al. | ............... | 398/30 |
| 2008/0044011 A1* | 2/2008 | Yoshida et al. | ............... | 380/28 |
| 2008/0095544 A1* | 4/2008 | Fuse et al. | ............... | 398/202 |
| 2008/0240734 A1* | 10/2008 | Fuse | ............... | 398/200 |
| 2010/0074447 A1* | 3/2010 | Luo et al. | ............... | 380/279 |
| 2010/0195831 A1* | 8/2010 | Tanaka et al. | ............... | 380/256 |
| 2010/0293380 A1* | 11/2010 | Wiseman et al. | ............... | 713/169 |
| 2011/0064222 A1* | 3/2011 | Wiseman | ............... | 380/255 |

FOREIGN PATENT DOCUMENTS

| | | |
|---|---|---|
| JP | 2002-077135 A | 3/2002 |
| JP | 2005-057313 A | 3/2005 |
| JP | 2007-193137 A | 8/2007 |

OTHER PUBLICATIONS

Miodrag J. Mihaljević, Generic framework for the secure Yuen 2000 quantum-encryption protocol employing the wire-tap channel approach, 2007, IEEE, pp. 1-5.*

Kenichi Ohhata et al., 10-Gb/s Optical Transceiver Using the Yuen 2000 Encryption Protocol, Sep. 15, 2010, IEEE, vol. 28, No. 17, pp. 1-10.*

Miodrag J. Mihaljević, Generic framework for the secure Yuen 2000 quantum-encryption protocol employing the wire-tap channel approach, May 24, 2007, The American Physical Society, pp. 1-5.*

Chuang Liang et al., Quantum Noise Protected Data Encryption in a WDM network, Huly 2005, IEEE, vol. 17, No. 7, pp. 1-3.*

Osamu Hirota et al., Quantum stream cipher by Yuen 2000 protocol: Design and experiment by intensity modulation scheme, Jul. 5, 2005, arxiv.org, pp. 1-10.*

Ohhata, Kenichi et al., "10-Gb/s Optical Transceiver Using the Yuen 2000 Encryption Protocol", Journal of Lightwave Technology, Sep. 15, 2010, vol. 28, No. 18, p. 2714-2723.

Corndorf, Eric et al., "Quantum-noise randomized data-encryption for WDM fiber-optic networks", 2005, Physical Review A. vol. 71, p. 1-11.

Hirota, Osamu et al., "Quantum stream cipher by Yuen—2000 protocol: design and experiment by intensity modulation scheme", Physical Review A, 2005, vol. 72, p. 1-10.

International Search Report of PCT/JP2011/054688, mailing date of Mach 29, 2011.

* cited by examiner

OPTICAL TRANSMISSION DEVICE AND RECEPTION DEVICE FOR YUEN ENCRYPTION, OPTICAL TRANSMISSION METHOD AND RECEPTION METHOD FOR YUEN ENCRYPTION, AND ENCRYPTED COMMUNICATION SYSTEM

TECHNICAL FIELD

The present invention relates to an optical transmission device and reception device for Yuen encryption, an optical transmission method and reception method for Yuen encryption, and an encrypted communication system.

BACKGROUND ART

In a modern information communication network, mathematical encryption for disrupting transmission information by a mathematical method is used in order to prevent a third party from eavesdropping on a communication message. Recently, development has begun on physical encryption aimed to achieve a higher degree of security by using the physical phenomena of a signal system in means of communication.

Among physical encryption, an encryption for using the quantum noise inevitably generated when an optical signal is received to achieve a high degree of security in terms of encryption is called Yuen encryption or quantum stream cipher, which is based on the Yuen-2000 protocol (called Y-00). With this encryption, a set of two signals for transmitting an information bit is called a base, and a plurality (M) of bases are prepared; a pseudorandom bit sequence where an initial key has been elongated by a pseudorandom bit generator is used to irregularly select the bases, and an optical signal corresponding to a selected base is used to transmit the information bit (called "plain text" in cryptology). The receiver uses the same secret key and pseudorandom bit generator as a transmitter, which are synchronized with the transmission side, to identify the binary signals of 1 and 0.

In Yuen encryption, an eavesdropper who is unaware of the key will not know which base is being used, and therefore it is necessary to identify 2M signals. In such a case, the error properties of the identification of the two values of a legitimate receiver will be substantially zero, and when a signal and noise effects are designed such that the error properties of the 2M identifications of the eavesdropper become severely deteriorated, an advanced concealment effect against the eavesdropper is obtained. Obtaining the concealment effect in this manner is called a principle of generating security gain based on a communication format and the noise effect.

Known communication formats for implementing Yuen encryption include the optical phase modulation format disclosed in Non Patent Literature 1 and the optical intensity modulation format disclosed in Non Patent Literature 2. In these formats, an optical signal corresponding to a base is deployed in conformity with a single relational formula. With the optical phase modulation format, deployment is made on the phase plane at positions where the circumference is spaced by the amplitude A equally apart with 2M signals. With the optical intensity modulation format, optical signals are deployed at 2M regular intervals using an intermediate point between a maximum intensity and a minimum intensity as a reference, or reducing the interval in a linear manner from a maximum to a minimum. Depending on applications, various other deployments have also been proposed.

The above-described signal deployment is an innovation for causing the effects of quantum noise to be realized evenly. Security (Q) relative to a secret key against an eavesdropper is readily assessed by the following formula (Non Patent Literature 2).

[Math. 1]

$$Q = \Gamma^{K/\log M} \tag{1}$$

In the formula, $\Gamma$ is the number of signals hidden by quantum noise, K is the length of the secret key, and M is the number of bases. The possibility of a secret key when $\Gamma = M$ is not reduced at all even though the number of observations is increased, and therefore, this is called information-theoretic security. With the phase modulation format, the quantum noise becomes equivalent to vacuum noise, and is therefore very low, making it difficult to increase $\Gamma$, but quantum noise in the intensity modulation format has a characteristic of appearing as quantum shot noise, and therefore there is a large amount of quantum noise and it is readily possible to increase $\Gamma$.

FIG. 1 is a diagram illustrating the configuration of Yuen encryption using optical intensity modulation according to the conventional art as recited in Non Patent Literature 2. The following provides a description of the fundamental principle of the Yuen encryption device according to the optical intensity modulation format, with reference to FIG. 1.

In FIG. 1, the conventional encrypted communications device is a configuration in which an optical transmission device 10 and an optical reception device 20 are connected by an optical communication pathway 30 such as an optical fiber. The optical transmission device 10 is provided with a carrier wave generation unit 11, an M-ary intensity modulation unit 12, a pseudorandom bit generation unit 13, a base selection control unit 14, and a transmission data generation unit 15. The optical reception device 20 is provided with a photodiode 21, an intensity determination unit 22, a signal determination unit 23, a pseudorandom bit generation unit 24, and a base selection control unit 25. The pseudorandom bit generation unit 13 of the optical transmission device 10 and the pseudorandom bit generation unit 24 of the optical reception device 20 have substantially the same configuration and function. The base selection control unit 14 of the optical transmission device 10 and the base selection control unit 25 of the optical reception device 20 have substantially the same configuration and function.

The carrier wave generation unit 11 is composed, for example, of a laser diode, and outputs a predetermined optical carrier wave. The transmission data generation unit 15 generates transmission data configured by information of "1"s and "0"s based on information to be transmitted. The pseudorandom bit generation unit 13 generates a binary pseudorandom bit sequence, specifically, a binary Running key sequence, based on an initial key K. The base selection control unit 14 divides the binary Running key sequence into blocks at every log M bit, thus converting to a decimal Running key corresponding to each of the blocks. The base selection control unit 14 selects one base from a base group in conformity with the Running key, and indicates the same to the M-ary intensity modulation unit 12 as base information. The M-ary intensity modulation unit 12 modulates the intensity of the optical carrier wave with transmission data using an optical intensity corresponding to the base indicated by the base information, and outputs the same to the optical reception device 20 via the optical communication pathway 30.

The photodiode 21 receives an intensity modulation optical signal outputted from the optical transmission device 10 via the optical communication pathway 30. The pseudorandom bit generation unit 24 generates a binary Running key sequence based on the initial key K. The base selection control unit 25 divides the binary Running key sequence into blocks at every log M bit, thus converting to a decimal Running key corresponding to each of the blocks. The base selection control unit 25 selects one base from the base group in conformity with the Running key, and indicates the same to the signal determination unit 23 as base information. The signal determination unit 23 controls how a received signal is determined, based on the base information indicated by the base selection control unit 25, extracts information of "1"s and "0"s contained in the signal, and outputs the same as reception data. Specifically, provided is a function for determining the same to be 1 or to be 0 when the received signal reaches higher or lower than a threshold value.

In the aforementioned conventional Yuen encrypted communication device, the deployment of the base group, specifically, the optical signals corresponding to each of the bases, used in the base selection control units 14 and 25 is an important element for determining the level of encryption.

CITATION LIST

Non Patent Literature

[NPL 1] E. Corndorf, C. Liang, G. S. Kanter, P. Kumar, H. P. Yuen, "Quantum noise randomized data encryption for wavelength division multiplexed fiber optic", Physical Review A, vol-71, 062326, (2005)

[NPL 2] O. Hirota, M. Sohma, M. Fuse, K. Kato, "Quantum stream cipher by Yuen-2000 protocol: design and experiment by intensity modulation scheme", Physical Review A, vol-72, 022335, (2005)

SUMMARY OF INVENTION

Technical Problem

FIG. 2 is an example of the deployment of an optical intensity signal having information-theoretic security against a cipher-text-only attack on the Yuen encryption using the optical intensity modulation. The following provides a description of an optical signal deployment method, with reference to FIG. 2. Firstly, an intensity modulation dynamic range is set to be from a maximum intensity $S_{max}$ to a minimum intensity $S_{min}$. A middle intensity of the maximum intensity $S_{max}$ and the minimum intensity $S_{min}$ is $[(S_{max}+S_{min})/2]$. The optical signal corresponding to each of the bases is configured from a high intensity and a low intensity, and is deployed with a rule that the high intensity is higher than the middle intensity and the low intensity is lower than the middle intensity. A base number M is decided to be a number sufficient for the distance (intensity difference) between adjacent signals among an optical signal group corresponding to the bases (for example, between an intensity $S_i$ and an intensity $S_{i+1}$) to be buried in the quantum shot noise. For example, as illustrated in FIG. 2, where the intensity of each of the signals has, from the maximum intensity $S_{max}$ to the minimum intensity 5 min, a sequence $S_1, S_2, \ldots, S_{M-1}, S_M, S_{M+1}, \ldots$, and $S_{2M}$, then sets of the optical signals corresponding to the bases is regulated as per $\{S_1, S_{M+1}\}, \{S_2, S_{M+2}\}, \ldots$. With between neighboring bases, the deployment is designed such that an intensity signal for transmitting the information "1" of transmission data and an intensity signal for transmitting the information "0" are inverted.

In the aforementioned conventional Yuen encrypted communication device, a legitimate receiver will identify binary signals where the distance between the signals is greater, and therefore there will be almost no error. However, an eavesdropper who does not know the initial key K is restricted to a reception method for identifying the signals of the 2M values where the distance between signals is small, and therefore quantum shot noise generates errors in the reception data. Accordingly, an eavesdropper is unable to obtain the information of the cipher text itself.

Such a contrivance is one type of random stream cipher, but because the randomization is done by quantum shot noise, it is not possible to use a calculation to return the randomness to definite values. Accordingly, because of these reasons, Yuen encryption is believed to be able to realize encryption having a higher level of security than conventional mathematical encryption system.

In this manner, in Yuen encryption, a communication system itself is configured from conventional optical communication, which has a weak quantum nature. Against an eavesdropper who does not know the key, an extremely high level of security is provided based on the fact that an innovation is achieved in that information cannot be obtained from quantum shot noise.

In encryption technology, a fact that an encryption mechanism has information-theoretic security signifies that decipherment is not possible even when infinite computer is used. With conventional mathematical encryption, information-theoretic security against a cipher-text-only attack is possible based on special conditions, but information-theoretic security against a known plain text attack is impossible in principle. Yuen encryption using the above signal deployment (FIG. 2) has been proven to ensure information-theoretic security against a cipher-text-only attack and to have partial security against a known plain text attack, but not enough. In Yuen encryption, as a characteristic of physical encryption, at least 10 billion×10 billion×10 billion or more circuit elements would be needed in order to implement a known plain text attack of the most fundamental principle using a receiver of the same format as the legitimate receiver among the plurality of methods for implementing a known plain text attack. This numerical value is physically impossible to realize, even in the future. In this manner, with a circuit having an astronomical number of constituent elements, under conditions said to be impossible, the possibility of realizing complete information-theoretic security against other known plain text attack techniques has not been denied.

An object of the present invention is to provide a method of configuring a transmission and reception method, by which it is possible to realize information-theoretic security against a known plain text attack under conditions said to be impossible with a circuit having an astronomical number of constituent elements, for Yuen encryption having information-theoretic security against a cipher-text-only attack.

Solution to Problem

The present invention relates to the realization of Yuen encryption having information-theoretic security against a known plain text attack, in which information data intended to be transmitted (called plain text in cryptology) is packetized into blocks and the sequence of the aggregate of packets is transmitted randomly.

The Yuen encryption optical transmission device according to the present invention has a basic constituent element for Yuen encryption comprising: a transmission information data sequence randomization device configured by an electrical noise generator for dividing an information data sequence to be transmitted into blocks, appending numbers to the blocks and packetizing the same, and randomizing the sequence of the packets; a pseudorandom bit generation unit for randomizing bases; a base selection control unit for associating the output sequence with a number of bases; and an intensity optical modulation unit for transmitting an optical intensity signal based on an information bit and one selected base.

Specifically, the Yuen encryption optical transmission device according to the present invention is a device for implementing the Y-00 protocol by an optical intensity modulation format, characterized in having a contrivance for dividing into blocks an information data sequence (input information) for an optical modulation unit, appending a sequence number to the blocks and packetizing the same, randomly sorting the sequence of the packets using an output sequence of an electrical noise generator, and making the same an input sequence for an optical modulation unit of Yuen encryption as a single sequence, and in comprising: a pseudorandom bit generation unit for generating a pseudorandom bit sequence from an initial key; a base selection control unit for holding a base group configured by a number of bases and selecting one base from the base group in conformity with the pseudorandom bit sequence; and an intensity optical modulation unit for using two optical intensities corresponding to the one selected base to generate an optical modulation signal based on transmission data, wherein, in all of the bases configuring the base group, the two optical signal intensities corresponding to each of the bases have values above and below an interposed intermediate point of a maximum intensity and a minimum intensity, the intensities of a signal group above the intermediate point being deployed concentrated around an optical intensity sufficiently spaced apart from the intermediate point and the intensities of the signal group below the intermediate point being deployed concentrated in the vicinity of an optical intensity sufficiently spaced apart from the intermediate point; and the range of intensities where the intensities of the signal group above the intermediate point and of the signal group below the intermediate point are respectively deployed in concentration is set so as to be entirely hidden by quantum shot noise appearing in proportion to the energy in the vicinity of the intensities of the signal group.

The optical reception device for receiving an optical signal outputted from the optical transmission device according to the present invention is characterized by comprising: a basic Yuen encryption reception device configured by: an intensity determination unit for using an intermediate point between a maximum reception intensity and a minimum reception intensity of a received optical intensity signal as an identification threshold value to determine a signal intensity and output the determination value; a pseudorandom bit generation unit for generating a pseudorandom bit sequence with respect to the determination value using the initial key of the optical transmission device; a base selection control unit for holding a base group configured by a number of bases and selecting one base from the base group in conformity with the pseudorandom bit sequence; and a signal determination unit for using the base selected by the base selection control unit to determine the 0s and 1s of the information data; and a reception data sequence reconstruction device configured by a sequence reconstituting unit for converting the sequence decoded thereby into blocks of a block length set on the transmission side and sorting the same into the order of sequence numbers appended to the blocks.

Specifically, a transmission unit according to the present invention is a Yuen encryption optical transmission method using the Y-00 protocol by an optical intensity modulation format, characterized in that an information data sequence to be transmitted is divided into bocks, the output of an electrical noise generator is used to randomize the sequence, and these are made into input, wherein, the two optical signal intensities corresponding to each of the bases for transmitting the data of 1s and 0s have values above and below an interposed intermediate point of a maximum intensity and a minimum intensity, the intensities of a signal group above the intermediate point being deployed concentrated around an optical intensity sufficiently spaced apart from the intermediate point and the intensities of the signal group below the intermediate point being deployed concentrated in the vicinity of an optical intensity sufficiently spaced apart from the intermediate point; and the range of intensities where the intensities of the signal group above the intermediate point and of the signal group below the intermediate point are respectively deployed in concentration is set so as to be entirely hidden by quantum shot noise appearing in proportion to the energy in the vicinity of the intensities of the signal group.

The reception unit according to the present invention is a Yuen encryption optical reception device for receiving the optical signal transmitted using the Yuen encryption optical transmission method, the device comprising: an intensity determination unit for using an intermediate point between a maximum reception intensity and a minimum reception intensity of a received optical intensity signal as an identification threshold value to determine the signal intensity and output the determination value; a pseudorandom bit generation unit for generating a pseudorandom bit sequence with respect to the determination value using the initial key of the optical transmission device; a base selection control unit for holding a base group configured by a number of bases and selecting one base from the base group in conformity with the pseudorandom bit sequence; a signal determination unit for using the base selected by the base selection control unit to determine the 0s and 1s of the information data; and a sequence reconstituting unit for converting the sequence decoded thereby into blocks of a block length set on the transmission side and sorting the same into the order of sequence numbers appended to the blocks.

Advantageous Effects of Invention

According to the present invention, it is possible to implement, at low cost, Yuen encryption having information-theoretic security against a known plain text attack under a constraint where an attack device having an astronomical scale of constituent elements cannot be realized when conventional Yuen encryption has information-theoretic security against a cipher-text-only attack.

DESCRIPTION OF EMBODIMENTS

The following is a more detailed description of a mode for carrying out the present invention (hereinafter, the "embodiment").

Figure 3:
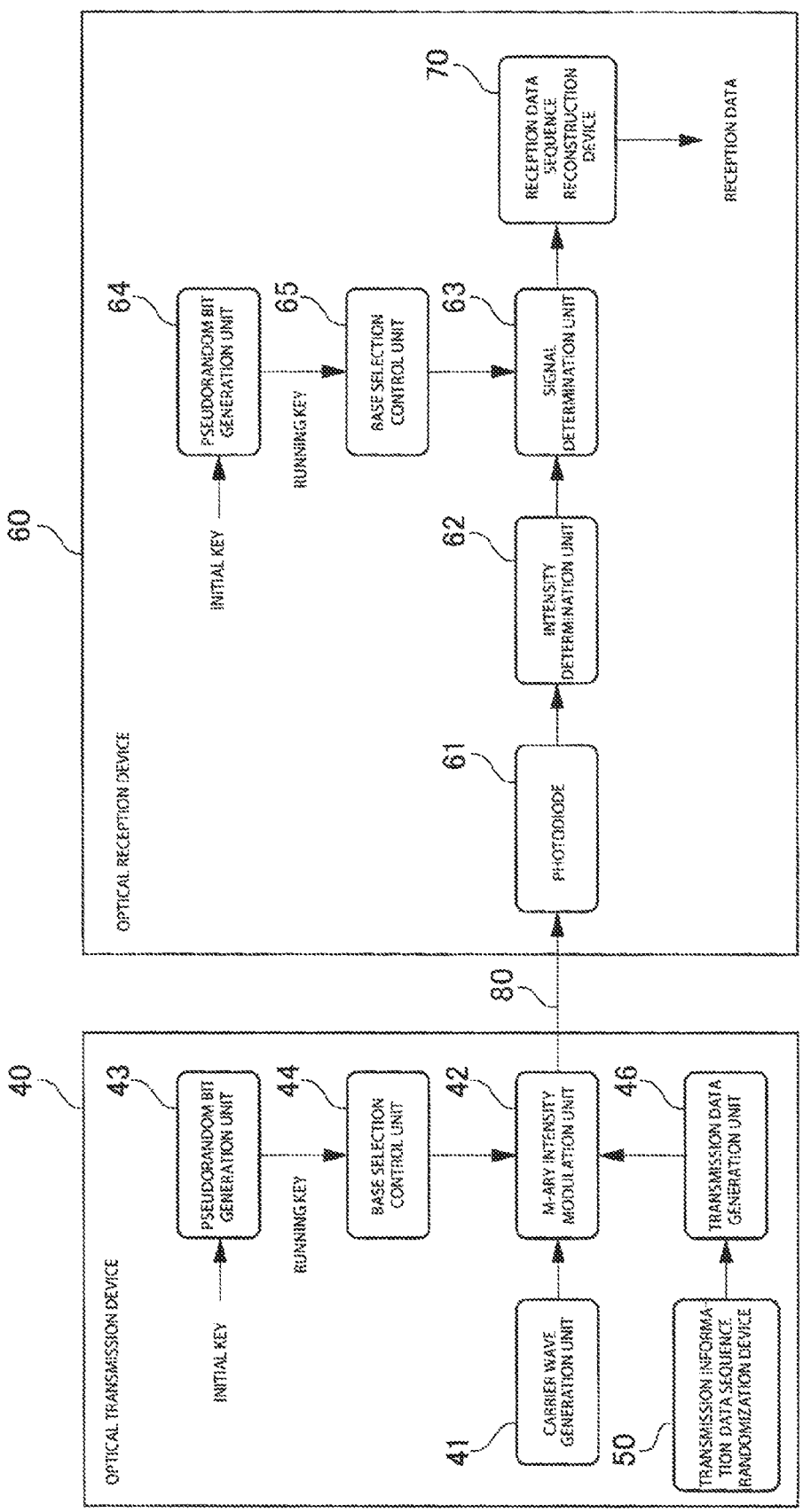
FIG. 3 is a diagram illustrating the configuration of the encrypted communication device using the Yuen encryption according to an embodiment of the present invention.

FIG. 3 is a diagram illustrating the configuration of the encrypted communication device using the Yuen encryption according to an embodiment of the present invention. As illustrated in FIG. 3, when an optical transmission device 40 and an optical reception device 60 according to the present invention are connected via an optical communication pathway 80 such as an optical fiber so as to implement the transmission and reception method according to the present invention, it is possible to configure an encrypted communication system according to the present invention.

Specifically, the Yuen encrypted communication system according to the present embodiment is provided with the optical transmission device 40, the optical reception device 60, and the optical communication pathway 80.

Figure 1:
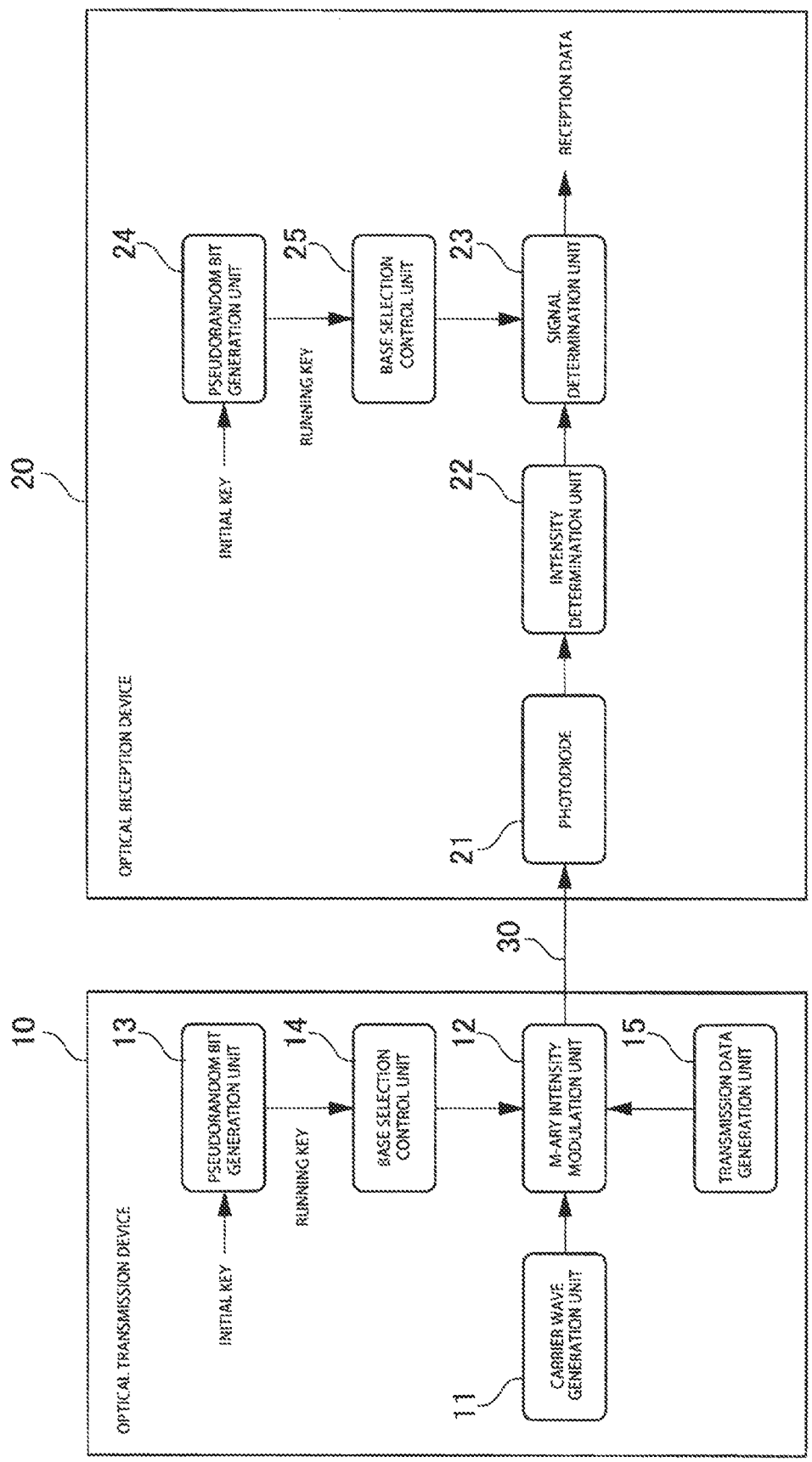
FIG. 1 is a diagram illustrating the configuration of Yuen encryption using the optical intensity modulation according to the conventional art.
Figure 2:
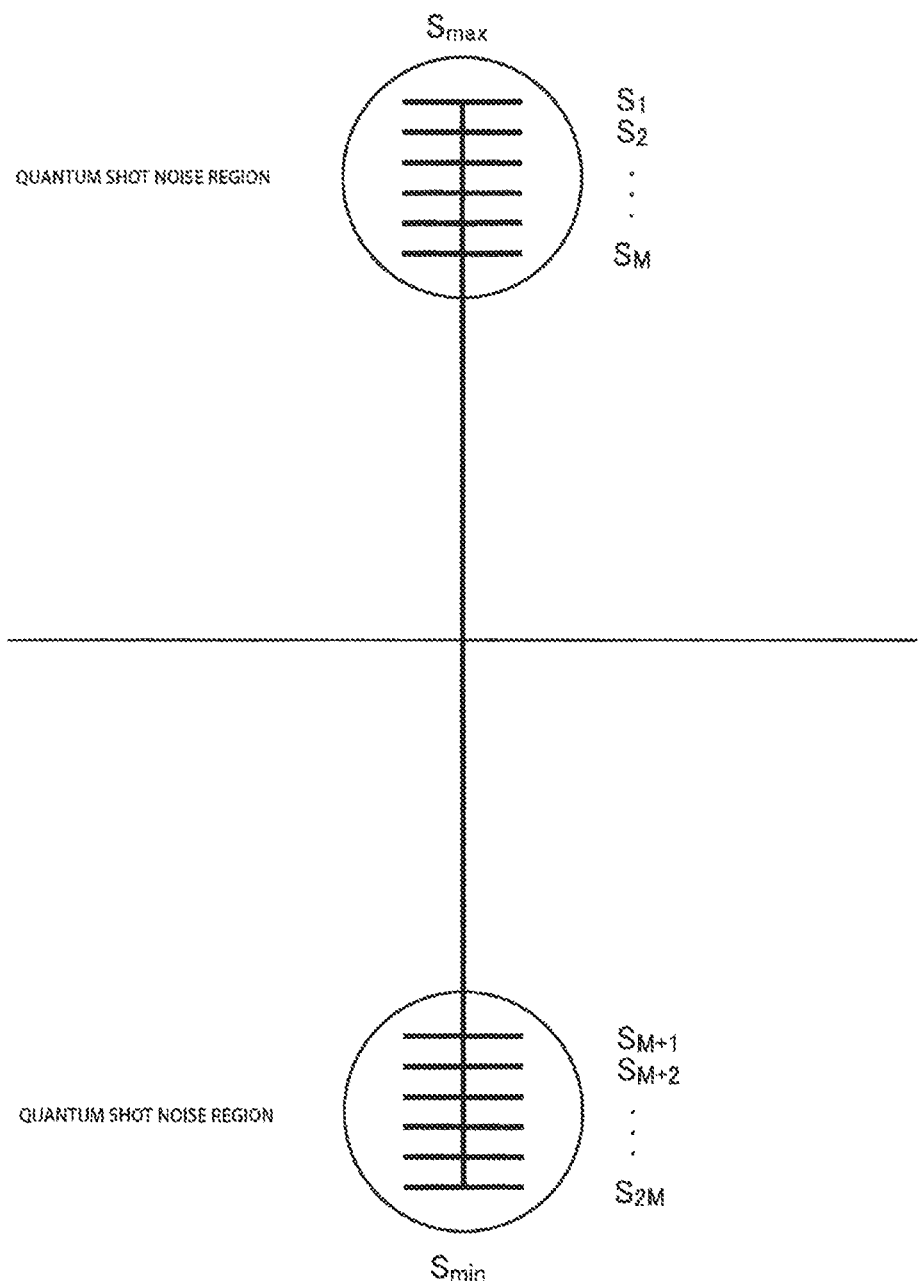
FIG. 2 is a diagram illustrating an example of the deployment of the optical intensity signal having information-theoretic security against a cipher-text-only attack on the Yuen encryption using the optical intensity modulation.

The optical transmission device 40 is provided with: a transmission information data sequence randomization device 50 for generating transmission information obtained by dividing input information into one or more blocks, appending a sequence number to the blocks and packetizing the same, and using the output sequence of an electrical noise generator (an electrical noise generation unit 54, FIG. 4) to randomize and sort the sequence of the packets; a pseudorandom bit generation unit 43 serving as a transmitter pseudorandom bit generation unit for generating a pseudorandom bit sequence from an initial key; a base selection control unit 44 serving as a transmitter base selection control unit for holding a base group configured by a number of bases and selecting one base from the base group in conformity with the pseudorandom bit sequence; and an M-ary intensity modulation unit 42 serving as an intensity optical modulation unit for using two optical intensities corresponding to the one selected base to generate an optical modulation signal based on the transmission information, wherein, in all of the bases configuring the base group, the two optical signal intensities corresponding to each of the bases have values above and below an interposed intermediate point of a maximum intensity and a minimum intensity, the intensities of a signal group above the intermediate point being deployed concentrated around an optical intensity sufficiently spaced apart from the intermediate point and the intensities of the signal group below the intermediate point being deployed concentrated in the vicinity of an optical intensity sufficiently spaced apart from the intermediate point; and the range of intensities where the intensities of the signal group above the intermediate point and of the signal group below the intermediate point are respectively deployed in concentration is set so as to be entirely hidden by quantum shot noise appearing in proportion to the energy in the vicinity of the intensities of the signal group. The operation of a carrier wave generation unit 41 is equivalent to that of the carrier wave generation unit 11 illustrated in FIG. 1.

In this manner, the optical transmission device 40 according to the present embodiment, prior to the input to a transmission data generation unit 46, uses the transmission information data sequence randomization device 50 according to the present invention to randomize the information data to be transmitted, inputs the same into the transmission data generation unit 46, and randomizes a relationship between a known plain text and an optical output. The relationship between the known plain text and the cipher text is thereby randomized. Accordingly, it is possible for the circumstances to allow for a known plain text attack and meanwhile for cipher text-only circumstances to be produced, whereby information-theoretic security against a known plain text attack can be realized.

In the optical reception device 60 according to the present embodiment, an optical signal is received via a photodiode 61 of FIG. 3. The operation of the photodiode 61 is the same as that of a photodiode 21 illustrated in FIG. 1. The optical reception device 60 is composed of an intensity determination unit 62 for setting a threshold value to a received signal intensity corresponding to a signal intensity at an intermediate point of between a maximum intensity and a minimum intensity and for outputting upper or lower information relative to the threshold value, and of a signal determination unit 63 for using an output sequence from a pseudorandom bit generation unit 64 and the same initial key used in the transmission device to determine the 0s or 1s of information bits through a base selection control unit 65; and encrypted communication is completed by using a reception data sequence reconstruction device 70 to return the output sequence to the original information data.

Figure 4:
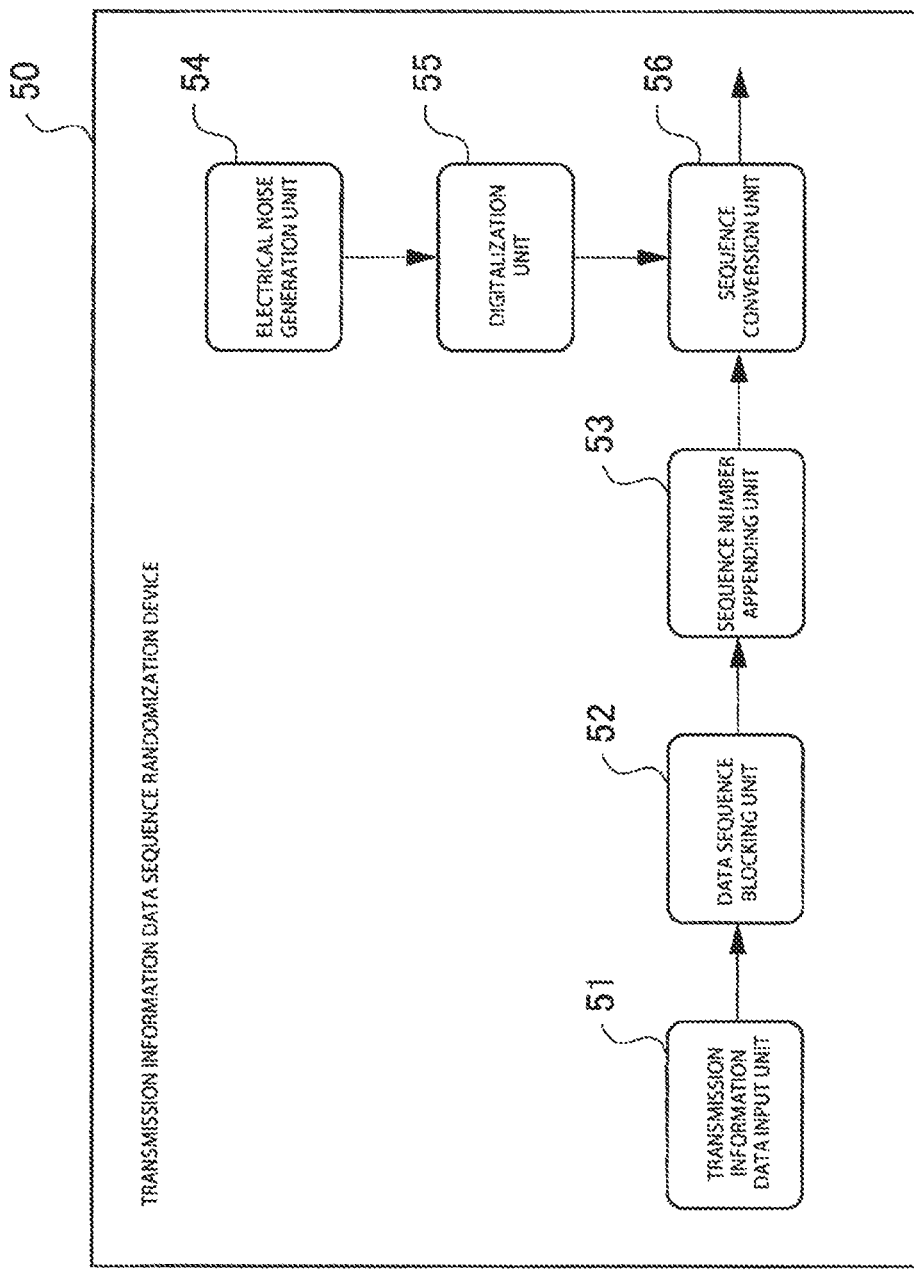
FIG. 4 is a diagram illustrating the configuration of a transmission information data sequence randomization device 50 according to the embodiment of the present invention.

FIG. 4 illustrates the configuration of the transmission information data sequence randomization device 50 according to the present invention. The Yuen encryption optical transmission device according to the present invention can be essentially configured by an optical transmission device 10 and the transmission information data sequence randomization device 50 illustrated in FIG. 1. Specifically, the optical transmission device 40 (FIG. 3) for Yuen encryption according to the present invention is configured by connecting the transmission information data sequence randomization device 50 to the input of a transmission data generation unit 15 of the optical transmission device 10 (FIG. 1) for conventional Yuen encryption.

Figure 5:
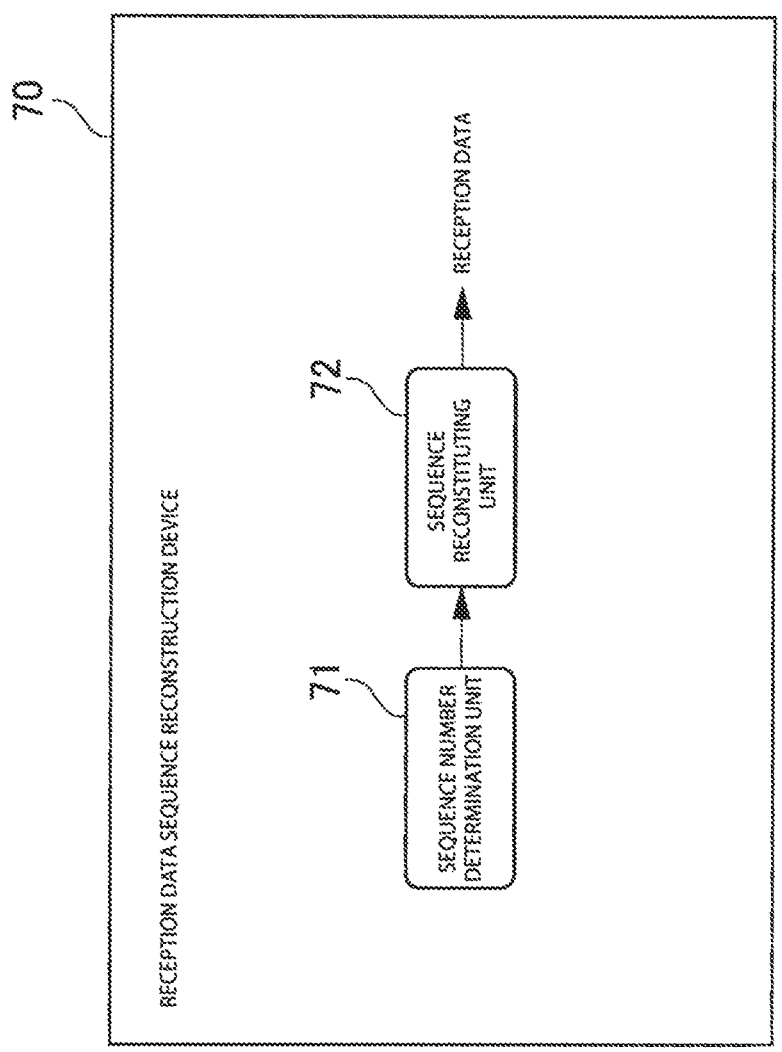
FIG. 5 is a diagram illustrating the configuration of a reception data sequence reconstruction device 70 according to the embodiment of the present invention.

FIG. 5 illustrates the configuration of the reception data sequence reconstruction device 70 according to the present invention. The optical reception device 60 (FIG. 3) according to the present invention is configured by connecting the reception data sequence reconstruction device 70 to the output of the signal determination unit of the optical reception device 20 for conventional Yuen encryption illustrated in FIG. 1.

The present invention has a characteristic wherein, as pre-processing for the input of the transmission data generation unit of the optical transmission device 10, an information data sequence is converted into blocks and the sequence thereof is randomized, and has a characteristic wherein this randomization is used to realize information-theoretic security against a known plain text attack by making independent the relationship between the information data and the optical signals having been encrypted. The following is a description of the randomization of characteristic data according to the present invention, with reference to the accompanying drawings.

(Randomization of information data sequence)

The configuration of the transmission information data sequence randomization device 50 illustrated in FIG. 4 will be used to describe a randomization of the information data sequence. In the embodiment of the present invention, the information data sequence is randomized as follows.

A data sequence to be transmitted (input information) is inputted to a transmission information data input unit 51. Subsequently, a data sequence blocking unit 52 converts the data sequence into blocks as a series of bit sequences. For example, blocking is performed for every m bits. Subsequently, a sequence number appending unit 53 appends to the aggregate of blocks a bit sequence corresponding to the sequence numbers. The electrical noise generation unit 54 generates electrical noise, and the noise is converted into numerical value information in a digitalization unit 55. A sequence conversion unit 56 uses the numerical value information based on the noise to randomize the sequence of blocks having the appended sequence numbers. Accordingly, the output of the sequence conversion unit 56 is a bit sequence having a random blocking sequence with respect to the inputted information data sequence. This output is sequentially sent to the transmission data generation unit of the Yuen encryption optical transmission device.

The randomization of the information data sequence according to the embodiment of the present invention causes an optical signal outputted from the optical transmission device to be a stirred form of both the randomized nature of the output sequence of the pseudorandom bit generation unit for selecting a base and the randomized information data sequence, even though the information data sequence is known.

Furthermore, signals in the upper half surface cannot be identified at all with the receiver of an eavesdropper when, in all of the bases configuring the base group, the two optical signal intensities corresponding to each of the bases have values above and below an interposed intermediate point of a maximum intensity and a minimum intensity, the intensities of a signal group above the intermediate point being deployed concentrated around an optical intensity sufficiently spaced apart from the intermediate point and the intensities of the signal group below the intermediate point being deployed concentrated in the vicinity of an optical intensity sufficiently spaced apart from the intermediate point; and the range of intensities where the intensities of the signal group above the intermediate point and of the signal group below the intermediate point are respectively deployed in concentration is set so as to be entirely hidden by quantum shot noise appearing in proportion to the energy in the vicinity of the intensities of the signal group. In the same manner, signals in the lower half surface also cannot be identified. Accordingly, in Formula (I), F=M and the possibility of a secret key against an eavesdropper becomes

[Math. 2]

$$Q=M^{K/\log M} \qquad (2)$$

the number of candidate keys will not decrease even when the cipher text corresponding to the known plain text is observed. Specifically, while the circumstances allow for a known plain text attack, the associated relationship between a cipher text and information data which is the plain text is random, and the circumstances become the same as those for a cipher-text-only attack. Because the system above has information-theoretic security against a cipher-text-only attack, the system will also have complete information-theoretic security against a known plain text attack.

As illustrated in FIG. 5, a description of the optical reception device for Yuen encryption using the randomization of the information data sequence will now be provided, with reference to the configuration of the reception data sequence reconstruction device 70 in the optical reception device for Yuen encryption using the randomization of the information data sequence according to the embodiment of the present invention.

In the reception data sequence reconstruction device 70 of the present embodiment, the information data sequence decoded without error by a receiving function of the conventional Yuen encryption is inputted to a sequence number determination unit 71 in block units on the transmission side, and is returned to the original sequence in a sequence reconstituting unit 72 based on the determination result of the sequence number. There is thereby obtained reception data free of the effects of randomization according to the present embodiment on the transmission side in the optical reception device according to the present embodiment.

As above, according to the optical transmission device and optical reception device for encrypted communication according to the present embodiment there can be provided, at low cost, a configuration method, a transmission method, a reception method, an optical transmission device, an optical reception device, and an encrypted communication system for an optical signal having heightened communication ability and able to ensure information-theoretic security against a known plain text attack as well as to increase the distance at which communication is possible for a legitimate communicating party.

The embodiment has been used above to describe the present invention, but it shall be readily understood that the technical scope of the present invention is not limited to the scope recited in the embodiment above. It is evident that the person having ordinary skill in the art that various modifications or improvements can be added to the embodiment above. It is also evident, based on the recitation of the claims, that the modes where the various modifications or improvements have been added are also included in the technical scope of the present invention.

INDUSTRIAL APPLICABILITY

The present invention can be used as a backbone technology for realizing an ultra-secure optical communication network between data centers required for a cloud computing system.

REFERENCE SIGNS LIST

10 Optical transmission device
11, 41 Carrier wave generation unit
12, 42 M-ary intensity modulation unit
13, 24, 43, 64 Pseudorandom bit generation unit
14, 25, 44, 65 Base selection control unit
15, 46 Transmission data generation unit
20 Optical reception device
21, 61 Photodiode
22, 62 Intensity determination unit
23, 63 Signal determination unit
30, 80 Optical communication pathway
40 Optical transmission device (having transmission information data randomization)
50 Transmission information data sequence randomization device
51 Transmission information data input unit
52 Data sequence blocking unit
53 Sequence number appending unit
54 Electrical noise generation unit
55 Digitalization unit
56 Sequence conversion unit
60 Optical reception device (having transmission information data randomization release)
70 Reception data sequence reconstruction device
71 Sequence number determination unit
72 Sequence reconstituting unit

The invention claimed is:

1. A Yuen encryption optical transmission device, which is connected with an optical communication pathway, for implementing Yuen-2000 encryption (Y-00) protocol, the optical transmission device comprising:

a transmission information data sequence randomization device for generating transmission information using Y-00 protocol, the transmission information data sequence randomization device comprising: a data sequence block divider for dividing input information into one or more blocks, a sequence number appender for appending a sequence number to the blocks and packetizing the same, and a sequence converter for randomizing and sorting the sequence of the packets using an output sequence of an electrical noise generator;

a transmission data generator connected with the transmission information data sequence randomization device, the transmission data generator configured to generate transmission data configured by 0s and 1s of information bit based on the transmission information;

a pseudorandom bit generator configured to generate a pseudorandom bit sequence from an initial key;

a base selection controller connected with the pseudorandom bit generator, the base selection controller configured to hold a base group configured by a number of bases and to select one base from the base group in conformity with the pseudorandom bits sequence; and an intensity optical modulator connected with the transmission data generator and the base selection controller, the intensity optical modulator configured to generate an optical modulation signal based on the transmission information using two optical intensities corresponding to the one selected base, and to output the optical modulation signal to the optical communication pathway, wherein in all of the bases constituting the base group, the two optical signal intensities corresponding to each of the bases have values above and below an interposed intermediate point of a maximum intensity and a minimum intensity, the intensities of signal group above the intermediate point being deployed concentrated in the vicinity of the maximum intensity and the intensities of signal group below the intermediate point being deployed concentrated in the vicinity of the minimum intensity, and the range of the intensities of the signal group above the intermediate point and the range of the intensities of the signal group below the intermediate point are set so as to be entirely hidden by quantum shot noise appearing in proportion to energy in the vicinity of the intensities of each signal group.

2. A Yuen encryption optical reception device for receiving an optical modulation signal outputted from an optical transmission device, the optical reception device comprising:

a photodiode for receiving the optical modulation signal sent by optical transmission device using Yuen encryption (Y-00) protocol via an optical communication pathway;

an intensity determiner for determining a signal intensity and outputting a determination value using an intermediate point between a maximum reception intensity and a minimum reception intensity of a received binary optical intensity signal as an identification threshold value;

a pseudorandom bit generator for generating a pseudorandom bit sequence with respect to the determination value using an initial key of the optical transmission device;

a base selection controller connected with the pseudorandom bit generator, the base selection controller configured to hold a base group configured by a number of bases and to select one base from the base group in conformity with pseudorandom bits sequence;

a signal determiner connected with an intensity determiner and the base selection controller, the signal determiner configured to determine 0s and 1s of an information bit using the base selected by the base selection controller; and a reception data sequence reconstruction device connected with the signal determiner, the reception data sequence reconstruction device configured to convert a data sequence composed of the information bits determined by the signal determiner into blocks of a block length set in the optical transmission device and to generate a reception data sequence reconstituted in the order of sequence numbers appended to the blocks, wherein in all of the bases constituting the base group, two optical signal intensities corresponding to each of the bases have values above and below an interposed intermediate point of a maximum intensity and a minimum intensity, the intensities of signal group above the intermediate point being deployed concentrated in the vicinity of the maximum intensity and the intensities of signal group below the intermediate point being deployed concentrated in the vicinity of the minimum intensity, and the range of the intensities of the signal group above the intermediate point and the range of the intensities of the signal group below the intermediate point are set so as to be entirely hidden by quantum shot noise appearing in proportion to energy in the vicinity of the intensities of each signal group.

3. A Yuen encryption optical transmission method using Yuen-2000 encryption (Y-00) protocol according to an optical intensity modulation format, comprising the steps of:

generating transmission information using Y-00 protocol, by dividing input information into one or more blocks, appending a sequence number to the blocks and packetizing the same, and randomizing and sorting the sequence of the packets using an output sequence of an electrical noise generator;

generating transmission data configured by 0s and 1s of information bit based on the transmission information;

generating a pseudorandom bit sequence from an initial key;

holding a base group configured by a number of bases and selecting one base from the base group in conformity with the pseudorandom bits sequence;

generating an optical modulation signal based on the transmission information using two optical intensities corresponding to the one selected base, and outputting the optical modulation signal to an optical communication pathway, and wherein in all of the bases constituting the base group, the two optical signal intensities corresponding to each of the bases have values above and below an interposed intermediate point of a maximum intensity and a minimum intensity, the intensities of signal group above the intermediate point being deployed concentrated in the vicinity of the maximum intensity, and the intensities of signal group below the intermediate point being deployed concentrated in the vicinity of the minimum intensity, and the range of the intensities of the signal group above the intermediate point and the range of the intensities of the signal group below the intermediate point are set so as to be entirely hidden by quantum shot noise appearing in proportion to energy in the vicinity of the intensities of each signal group.

4. A Yuen encryption optical reception method for receiving an optical modulation signal transmitted using Yuen-2000 encryption (Y-00) protocol, comprising the steps of:

receiving the optical modulation signal sent by using Y-00 protocol via the optical communication pathway;

determining a signal intensity and outputting a determination value using an intermediate point between a maximum reception intensity and a minimum reception intensity of a received binary optical intensity signal as an identification threshold value;

generating a pseudorandom bit sequence with respect to the determination value using an initial key;

holding a base group configured by a number of bases and selecting one base from the base group in conformity with the pseudorandom bit sequence;

determining the 0s and 1s of an information bit using the base selected; and converting the data sequence composed of the information bits determined into blocks of a block length set in the optical transmission method and generating a reception data sequence reconstituted in the order of sequence numbers appended to the blocks, wherein in all of the bases constituting the base group, two optical signal intensities corresponding to each of the bases have values above and below an interposed intermediate point of a maximum intensity and a minimum intensity, the intensities of signal group above the intermediate point being deployed concentrated in the vicinity of the maximum intensity and the intensities of signal group below the intermediate point being deployed concentrated in the vicinity of the minimum intensity, and the range of the intensities of the signal group above the intermediate point and the range of the intensities of the signal group below the intermediate point are set so as to be entirely hidden by quantum shot noise appearing in proportion to energy in the vicinity of the intensities of each signal group.

5. A Yuen encrypted communication system for implementing Yuen-2000 encryption (y-00) protocol according to the optical intensity modulation format, the Yuen encrypted communication system having a Yuen encryption optical transmission device and a Yuen encryption optical reception device connected with the Yuen encryption optical transmission device via an optical communication pathway, the Yuen encryption optical transmission device comprising:

a transmission information data sequence randomization device for generating transmission information using Y-00 protocol, the transmission information data sequence randomization device comprising: a data sequence block divider for dividing input information into one or more blocks, a sequence number appender for appending a sequence number to the blocks and packetizing the same, and a sequence converter for randomizing and sorting the sequence of the packets using an output sequence of an electrical noise generator;

a transmission data generator connected with the transmission information data sequence randomization device, the transmission data generator configured to generate transmission data configured by 0s and 1s of information bit based on the transmission information;

a transmitter pseudorandom bit generator configured to generate a pseudorandom bit sequence from an initial key;

a transmitter base selection controller connected with the transmitter pseudorandom bit generator, the transmitter base selection controller configured to hold a base group configured by a number of bases and to select one base from the base group in conformity with the pseudorandom bit sequence;

an intensity optical modulator connected with the transmission data generator and the transmitter base selection controller, the intensity optical modulator configured to generate an optical modulation signal based on the transmission information using two optical intensities corresponding to the one selected base, and to output the optical modulation signal to the optical communication pathway, wherein in all of the bases constituting the base group, the two optical signal intensities corresponding to each of the bases have values above and below an interposed intermediate point of a maximum intensity and a minimum intensity, the intensities of signal group above the intermediate point being deployed concentrated in the vicinity of the maximum intensity, and the intensities of signal group below the intermediate point being deployed concentrated in the vicinity of the minimum intensity, and the range of the intensities of the signal group above the intermediate point and the range of the intensities of the signal group below the intermediate point are set so as to be entirely hidden by quantum shot noise appearing in proportion to energy in the vicinity of the intensities of each signal group, and the Yuen encryption optical reception device comprises:

a photodiode for receiving the optical modulation signal sent by the Yuen encryption optical transmission device using Y-00 protocol via the optical communication pathway;

an intensity determiner for determining a signal intensity and outputting a determination value using an intermediate point between a maximum reception intensity and a minimum reception intensity of a received binary optical intensity signal as an identification threshold value;

a receiver pseudorandom bit generator for generating a pseudorandom bit sequence with respect to the determination value using the initial key of the optical transmission device;

a receiver base selection controller connected with the receiver pseudorandom bit generator, the receiver base selection controller configured to hold a base group configured by a number of bases and to select one base from the base group in conformity with the pseudorandom bit sequence;

a signal determiner connected with the intensity determiner and the receiver base selection controller, the signal determiner configured to determine the 0s and 1s of an information bit using the base selected by the receiver base selection controller; and a reception data sequence reconstruction device connected with the signal determiner, the reception data sequence reconstruction device configured to convert the data sequence composed of the information bits determined by the signal determiner into blocks of a block length set in the Yuen encryption optical transmission device and to generate a reception data sequence reconstituted in the order of sequence numbers appended to the blocks.

* * * * *

UNITED STATES PATENT AND TRADEMARK OFFICE
CERTIFICATE OF CORRECTION

PATENT NO.      : 8,867,742 B2
APPLICATION NO. : 13/582581
DATED           : October 21, 2014
INVENTOR(S)     : Osamu Hirota It is certified that error appears in the above-identified patent and that said Letters Patent is hereby corrected as shown below:

In the Specification

Column 3 Line 57
Change
"5 min,"
To be
-- $S_{min}$, --

Column 9 Lines 36 – 37
Change
"(I), F=M"
To be
-- (1), $\Gamma$=M --

Signed and Sealed this
Twelfth Day of May, 2015

Michelle K. Lee
*Director of the United States Patent and Trademark Office*